Patented Jan. 6, 1942

2,268,947

UNITED STATES PATENT OFFICE 2,268,947

PHENOL MODIFIED ESTERS

William Krumbhaar, New York, N. Y.

No Drawing. Application July 6, 1940,
Serial No. 344,271

12 Claims. (Cl. 260—19)

This invention relates to a new method of producing phenol modified esters of resinous character, which are superior to phenol modified synthetic resins heretofore produced, because of the high viscosity, quick-drying, extreme hardness, paleness of color, and the good chemical resistance they impart to surface coatings.

The production of phenolic resins, modified by components such as rosin, fatty acids, maleic acid, phthalic acid and similar derivatives, has long been known, the most important among them being the rosin modified phenolics.

The oldest method of manufacturing rosin modified phenolics consisted in dispersing physically phenol formaldehyde condensates in rosin, without chemically combining the phenolic and the colophony components. The products, containing uncombined rosin, were inferior in film forming properties.

The principle of another method consists in incorporating into substantially neutral rosin ester, i. e., commercial ester gum, a formaldehyde condensate of mainly para substituted phenols. Neither in this case does a chemical reaction of the phenol condensate with the surrounding medium take place, the resinification being simply due to a continued self-condensation of the phenol product. The result is, that this type of rosin modified phenolic contains large molecules of phenol condensates physically dispersed in ester gum. Therefore, such resins are chemically inhomogeneous, and are unsuited to develop the highest degree of film-forming properties.

The principle of a third method consists in combining the rosin with the phenolic compound, and tying up the molecules of the product obtained in this way by esterification with glycerine. The resulting products contain rather large molecules, are comparatively chemically homogeneous, and the resins possess good properties of drying and resistance. However, even so, the highest degree of film-forming properties is not developed, because of the comparatively small number and low reactivity of the hydroxyl groups present in the phenol compounds applied in this procedure.

Among the objects of the present invention is the use of monomeric phenolic ether alcohols for the purpose of producing phenol modified esters of resinous character with superior properties.

The phenol modified esters are produced from monomeric phenolic ether alcohols which in turn are formed from monomolecular phenol methylol compounds with lower polyhydric alcohols reactive therewith such as glycerol or ethylene glycol as set forth in the companion copending application Serial No. 334,977, filed May 13, 1940, entitled Phenol modified ethers, of which the present application is a continuation-in-part. As there set forth, the phenols are converted into their alcohols by reaction with one or two mols of formaldehyde under conditions which lead to strictly monomolecular compounds. This is desirably carried out by conducting the reaction at relatively low temperature, preferably below 30° C. during the first period of reaction and not above 40° C. in the later stages. The phenol alcohols are precipitated from their alkaline solution by acidification, then washed carefully to eliminate acids which promote resinification, and dried at substantially room temperature. In this way monomolecular methylol compounds are obtained, which crystallize from their benzol solution in the form of white needles. Under practical conditions of production they are obtained in the form of thin oily liquids.

The monomolecular phenol alcohols utilized in the production of the phenolic ether alcohols are markedly different from the customary condensation products of phenols and formaldehyde. The customary products are benzine and oil soluble, whereas the phenol alcohols utilized in accordance with the present invention are on the contrary, insoluble in benzine, aliphatic hydrocarbons or turpentine, and insoluble in oils. Differing from the customary condensation products, the monomeric phenol alcohols used for reaction with the lower polyhydric alcohols such as glycerol or ethylene glycol, are miscible with and soluble in such polyhydric alcohols. When such phenol alcohols are stored as such over a period of a few weeks, they gradually lose their monomolecular state due to internal condensation. Such change in character is evidenced by loss of solubility in glycerol and an acquired solubility in benzine and oil, they have at the same time become more viscous and gradually are converted into the customary type of condensation products. While this change in solubility occurs, there is a concomitant change in reactivity leading to a loss of reactivity with the polyhydric alcohols such as glycerol or ethylene glycol to the extent that such change has taken place. The prior art condensation products of phenols and formaldehyde are, therefore, unsuitable for the purposes of the present invention. The decrease in reactivity referred to above, is very pronounced even after a few days of storage so that for the purposes of the present invention the phenol alcohols should be used in monomeric condition and most desirably when freshly prepared. Actually the best results are obtained by the use of the monomeric phenol alcohols in their substantially pure crystallized form.

In carrying out the production of the phenolic ether alcohols, the desired polyhydric alcohols reactive with the phenol alcohols are dissolved in monomolecular phenol alcohols. The homogeneous solution thus produced is desirably subjected to vacuum treatment at room temperatures, under conditions of vacuum, temperature, catalysts, type and proportions of reactants to give monomeric reaction products. To exemplify such reacting conditions, the following considerations are noted.

Sufficiently high vacuum is required to induce the reaction; as a rule at least 10 mm. are necessary at 15°, 15 mm. at 20°, or 20 mm. at 25°. Under such conditions the reaction starts immediately and continues under heavy foaming. Water is split off during the reaction but no phenolic decomposition products are distilled off. The reaction depends entirely on sufficiently high vacuum; if the vacuum is decreased below the specified degree, the reactivity drops suddenly and can be promoted only by further slight increase in temperature. However, temperatures high enough to favor self-condensation should be strictly avoided. The practical limits of the reaction are about 30 mm., applied up to temperatures of 40° C. If the vacuum is decreased further, a rise in temperature will not produce the desired reaction. For instance, at a vacuum of 125 mm., the temperature is to be raised to 70° C. in order to cause some reactivity. The reaction, however, is not the etherification, but a plain self-condensation as evidenced by a test of the reaction product. If the mixture of phenol alcohol and polyhydric alcohol is heated without any vacuum, reactivity starts only at 100° C., resulting in a resinification of phenol alcohols, evidenced by clouding of the mixture.

The formation of the monomeric phenolic ether alcohols takes place at the above specified degrees of temperatures and vacuum. Sometimes slight increase in temperature is desirable to accelerate the reaction in its final stage, particularly if an excess of glycerol is present. However, it always has to be kept in mind, that the essential feature of the process consists in carrying it out at low temperature, to avoid any self-condensation of the phenol alcohol. This is especially important for the first stage of the reaction.

To facilitate the etherification, the reactants should be as water free as possible. For instance, the phenol alcohols are preferably freed from mechanically admixed water by drying at low temperature under vacuum; the polyhydric alcohol, particularly the glycerol, is applied in the form of high gravity material. The customary dehydrating agents can be used in the process, but they are difficult to eliminate from the finished product. Reaction catalysts should be eliminated carefully, since they are liable to promote resinification.

The progress of the reaction under vacuum can be easily followed by taking samples and determining the amount of free glycerol which is taken out when the sample is shaken with water, or which settles from the solution when the sample is dissolved in benzol or toluol. The unreacted phenol alcohol, in addition, is characterized by its tendency to crystallize in white needles from the benzol solution. If not more than the maximum amount of glycerol is employed, and if the reaction is carried to completion, the product does not give off any glycerol to water, is completely soluble in benzol, and no crystallization takes place from the benzol solution.

The proportion of phenol alcohol and polyhydric alcohol in the reaction mixture is limited with regard to the amount of glycerol or ethylene glycol present. The maximum amounts of glycerol or ethylene glycol combined chemically by the phenol alcohol are only one mol polyhydric alcohol on one mol phenol dihydric alcohol. If larger amounts of polyhydric alcohols are present in the reaction mixture the excess remains uncombined and, if possible, an excess is avoided, because it retards reaction. Lower than the specified amounts readily form a homogeneous mixture, because the phenol ether alcohol is miscible with the phenol alcohol. As a rule, an excess of the phenolic component facilitates the etherification reaction.

The weights of phenol alcohols and polyhydric alcohols which enter into reaction with each other cannot be given with complete exactness, however, a series of tests with varying proportions, proves clearly that the weights are based on the reaction of one hydroxyl group of the polyhydric alcohol with one hydroxyl group of the phenol alcohol, i. e., equi-molecular weights give the best results. A determination of the loss of water, split off during the reaction, also proves that as a rule one of the phenolic or alcoholic hydroxylic groups of the phenol alcohols links up by etherification with one hydroxyl group of the polyhydric alcohols, indicating that phenolic ether alcohols are formed. All of the evidence, therefore, indicates that the reaction products produced are of etherified character; but regardless of any theoretical consideration, important and novel reaction products are obtained from the stated materials under the conditions given in the present specification.

Phenol monohydric alcohols enter into the same reaction as do phenol dihydric alcohols. However, the reaction products do not contain more hydroxyl groups per molecule than the constituents used in forming such reaction products, and therefore, are not particularly used in the preparation of coating composition components, but such reaction products may be used where it is not essential that they contain more hydroxyl groups per molecule than the constituents from which produced.

The phenols used as raw materials for the production of the phenolic ether alcohols should be those which give monomeric reaction products under the conditions referred to. For practical purposes the phenols utilized are limited to a few types. Phenol alcohols prepared from the U. S. P. phenol or cresol do not react with glycerol or ethylene glycol under the conditions specified above, even when employed in strictly monomolecular form. Among the phenols with substituents of high molecular weight, only those phenols are employed which are soluble in glycerol and which can be converted into alcohols without resinification. Consequently the cyclohexyl and phenyl phenols, and also binuclear phenols of high melting points, are unsuitable for the purposes of the present invention.

The most important of the derivatives employed in accordance with the present invention are illustrated by the butyl and amyl substituted phenols, particularly para-tertiary butyl and amyl phenols.

The phenolic ether alcohols obtained from para-tertiary butyl or amyl phenol in the process outlined above, are viscous liquids, soluble in aromatic hydrocarbons, insoluble in aliphatic hydrocarbons. On heating alone, they condense in themselves, giving off water. They can be heated without gelling or hardening to 200° C., and even after long heating above 200° C. they do not become insoluble or infusible. They are furthermore miscible with the phenol alcohols themselves, either monomeric or polymeric, such mixtures having unique properties due to the presence of the new type of phenol ether alcohols.

The invention relates particularly to phenolic synthetic resins produced from reaction products of the above phenol ether alcohols with an acid component. For coating composition purposes, the acid component generally falls into one of the three groups: (a) natural acid resins and the acids of such resins, like rosin and the copals; (b) fatty acids; (c) polybasic acids including aliphatic unsaturated acids like maleic and aromatic acids like phthalic as well as their synthetic resins such as phthalic or maleic resins; or various combinations of such acid components from the same or different stated groups may be used.

Compared to the former methods of manufacture, the method of this invention produces new and unique esters of resinous character, because it actually creates resins of larger molecular size and higher degree of chemical homogeneity, resulting in better drying properties, greater mechanical toughness and more chemical resistance. This effect can be proved experimentally by comparing under comparable conditions, the drying speed, the hardness and the alkali resistance of two varnishes, one made on the base of the former phenolic resin type, the other one produced on the base of the new resin type.

Among the phenol modified ethers used as modifying agent in the present invention, those ether alcohols are preferred which are derived from para substituted butyl and amyl phenols, because of the excellent color and color retention of the finished products. Those particular merits of para substituted phenols mentioned are developed to an unusual degree, if they are applied in the form of their ether alcohol derivatives and in the manner described in this invention. They react with acidic resinifying substances at temperatures ranging from 150–275° C. The reaction is based on an involved mechanism, and the proportions of acidic substances and ether alcohols, therefore, may vary widely, depending on the type of acid material to start with and the properties desired in the final product.

The most important phenol modified resins are those modified with rosin. Practically neutral and high melting resins of this type are obtained by applying 20 to 40% of phenol ether alcohols as modifying agent on rosin, whereby products are obtained which contain between 90 and 70% of a colophony component, due to considerably splitting off of water. If less than 20% are used, it is advisable to apply additional glycerol to completely neutralize the rosin. Products with higher than 90% rosin content have little technical importance, whereas resins with lower than 70% colophony content are technically objectionable because they have extremely high melting points, and, therefore, are difficult to handle in the kettle.

Similar viewpoints relate to the phenol modification of natural resins, other than rosin, such as recent and fossil copals. Best suited for phenol modifying purposes are acid resins with an acid value above 50, particularly the soft alcohol soluble copals, or hard copals such as Congo, after they have been made soluble by pretreatment according to the mastication process described in my United States Patent No. 2,007,333.

Because of the high viscosity imparted by copals to synthetic resins, for phenol modifying purposes, the presence of fluxing agents such as rosin, rosin ester or oils is necessary. As a general rule the content of recent or fossil gums in such reaction mixtures should not exceed 25%.

In addition to the phenol modified resins on the base of natural gums, other important types have to be mentioned, especially those based on fatty acids and polybasic acids, including aliphatic unsaturated acids like maleic and aromatic acids like phthalic.

Among the fatty acids used for reacting with phenolic ether alcohols, those complex mixtures of acids which are derived from the glyceride oils including drying, semi-drying and non-drying oils are most important. In addition, individual fatty acids can be used, including stearic, palmitic, oleic, linolic, linoleic acids, as well as lauric and cocoanut oil acids. Fatty acids, such as linseed, soya, fish oil and castor oil fatty acids, react very easily with the ether alcohols; the presence of neutral glycerides, for instance, of the oils themselves, of rosin ester or copal ester, is desirable to facilitate kettle procedures. The resulting products are outstanding for water and alkali resistance.

Esters can be produced from other monocarboxylic acids such as aliphatic and aromatic acids, both hydroxy and non-hydroxy types, including the lower fatty acids such as acetic and propionic, and aromatic acids such as benzoic. Inorganic acids, particularly polybasic acids such as phosphoric, may also be utilized. But for coating compositions, the higher fatty acids as exemplified above are preferred in the production of the phenol modified esters in accordance with the present invention.

Among the polybasic acids a number of saturated and unsaturated aliphatic and aromatic di- and other polycarboxylic acids or their anhydrides are available for the purpose of phenol modification. As particularly important are mentioned the maleic, malic, fumaric, succinic, adipic, sebacic, citric, phthalic and polybasic acids derived from terpenes. In all cases the amount of phenolic component is kept rather low, i. e., as a rule below 25% of the reaction mixture, in order to avoid gelation of the resin. Mostly it is also desirable to add fluxing agents such as rosin, rosin ester, masticated copals, glyceride oils, mineral oils, etc.

The reaction products of the ether alcohols with maleic acid or maleic anhydride are extremely interesting for their high viscosity and good drying properties. They form easily in the temperature range from 150–250° C. For practical reasons it is preferred to have rosin ester present as fluxing agents; such a fluxing agent may also be produced during the process due to the presence of free rosin and an excess of free glycerine.

Similar considerations are true for the phenol modification of phthalic resins. The phenol ether alcohol can be introduced into the customary phthalic resins at a temperature between 200 and 240°, taking care that the phthalic resin is compounded in a way that it contains sufficient free acid to bind the hydroxyl groups of the ether alcohol. Another method of producing phenolic modified phthalics consists in reacting all ingredients together; in this case the presence of fluxing agents such as glycerides of fatty acids or abietic acid is particularly desirable. Such glycerides may be present from the beginning of the process or they may be formed during the process.

The phenol ether alcohols may be reacted with the glyceride oils such as linseed oil, in a reaction similar to that when such oils are reacted with glycerol, resulting in the formation of phenol containing alcoholates by alcoholysis. The complexes thus produced may be used as a means for readily reacting glyceride oils or their acids into resinous complexes.

A large variety of phenol modified esters can be produced in the way described above, in the form of oily, viscous or hard and brittle resinous products. They all are distinguished by unique properties and surpass the customary type of phenol modified resins by improved film-forming properties. They all have the additional advantage that the actual process of phenol modification proceeds easier, requiring shorter time and lower temperature, yielding less foam and distillation products, thereby resulting in a better product.

The invention is more fully understood by the following examples:

I

A phenol modified rosin ester, suitable as varnish gum, is prepared by adding 30 parts of butyl phenol ether alcohol slowly to 100 parts of molten wood rosin at a temperature of about 200° and heating this mixture up to 275°. The reaction of the abietic acid with the hydroxyl groups of the phenol ether alcohol requires 4–6 hours, and is facilitated in the last stage by application of a slight vacuum. The butyl phenol ether alcohol is prepared by dissolving 200 parts of para-tertiary butyl phenol in 200 parts of a 6% caustic soda solution at 50° C., and adding slowly under cooling 275 parts 30% aqueous formaldehyde. The mixture is kept for 12 hours at 30° C. and 36 hours at 40° C., whereby the formation of the dihydric alcohol is practically complete. The latter is then set free by acidification, washed with water several times, and separated from all mechanically admixed water. In this way 300 parts of a slightly wet monomolecular liquid phenol-alcohol are obtained, which is benzine and oil insoluble, but readily miscible with glycerol. This product, while still in monomeric condition, is now mixed cold with 110 parts of high gravity glycerol, and the mixture subjected to vacuum treatment at room temperature. As soon as the vacuum reaches 15 mm., a strong reaction with heavy foaming starts, and continues, the temperature cooling down to below 15° C. After the foam subsides, the temperature is increased gently in order to carry the reaction to completion. Finally 375 parts of a light colored oily phenolic ether alcohol are obtained.

II

A commercially very valuable phenolic resin is manufactured by reacting together at 275°, 100 parts of gum rosin with 15 parts of amyl phenol ether alcohol and 5 parts of glycerol, the latter two ingredients being previously mixed with the rosin at 200°. The process is carried out in a closed vessel under $CO_2$ and finished under vacuum. The finished product has an acid value of 25 and a melting point of 115° C. The amyl phenol ether alcohol used in this example is prepared from one mol para-tertiary amyl phenol and two mols formaldehyde in the manner described in Example I. 75 parts of the monomolecular product are mixed with 25 parts of ethylene glycol and the mixture subjected to vacuum treatment. At 25° C. and 10 mm. vacuum, a violent reaction takes place, which, after the strong foaming subsides, is carried to completion by bringing the temperature up to about 40° C., maintaining the vacuum below 20 mm. A homogeneous phenolic ether alcohol, insoluble in water, soluble in benzol, is obtained.

III

A high melting phenol modified mixed ester of abietic and copal acids is produced in the following manner: 80 parts of gum rosin are fused together with 20 parts of masticated Congo copal, pretreated according to United States Patent No. 2,007,333. After the mixture is homogeneous at 220°, 35 parts of a phenol modified ether are added, previously prepared from 70 parts of monomeric butyl phenol di-alcohol and 30 parts of glycerol, as described in Example I. The reaction mixture is heated up to 275° and kept at this temperature, first under $CO_2$, later under vacuum, until an acid number of 25 and a melting point of 150° C. is obtained.

IV

A highly waterproof stand oil, representing the type of phenol modified ester described in this application, is obtained in a very simple way, by neutralizing the free acid present in bodied linseed oil by means of the butyl or amyl phenolic ether alcohols of Example I or II. For this purpose, for instance, 100 parts of a bodied linseed oil, having an acid value of 15, is reacted with 5 parts of the phenolic ether alcohol. This example can be varied in a very interesting way by replacing the bodied linseed oil by bodied fish oil.

V

Mixed phenol modified esters of exceptional color, hardness and chemical resistance are made on the base of maleic anhydride, using the following quantities and procedure: 10 parts of maleic anhydride are reacted at 180° with 15 parts of a butyl phenol ether alcohol, as described in Example I, in the presence of 100 parts of ester gum, which act as a fluxing agent. The reaction is carried to completion at 260°, requiring about four hours heating under $CO_2$, and two hours under a vacuum of 23".

VI

A quick-drying, water resistant alkyd resin of the phenol modified ester type is made by reacting together at 220–240°: 100 parts of linseed oil fatty acid, 200 parts of amyl phenolic ether alcohol, the production of which is described in Example II, 100 parts of phthalic anhydride, the three ingredients being dispersed in 300 parts of perilla oil. The reaction is carried to completion by using both a stream of $CO_2$ and vacuum, and is interrupted when the proper viscosity is reached.

VII

Another type of phenol modified alkyd resin of excellent technical properties is produced by reacting together:

| | Parts |
|---|---|
| Castor oil | 100 |
| Glycerine | 60 |
| Phthalic anhydride | 120 |
| Phenolic ether alcohol | 60 | in the presence of 200 parts of ester gum. The ingredients combine slowly while being heated for several hours at 210°. The reaction is carried out to completion by raising the temperature up to 230° C. The phenolic ether alcohol can be either one of the types used in the previous examples.

Having thus set forth my invention, I claim:

1. The method of producing reaction products which comprises reacting an alkyl phenol in which the alkyl group contains from 4 to 5 carbon atoms with formaldehyde under conditions to produce a monomeric alkyl phenol alcohol, reacting at a temperature below 40° C. under a vacuum of not above about 30 mm. pressure said monomeric alkyl phenol alcohol with a polyhydric alcohol reactive therewith to produce a monomeric etherified alkyl phenol alcohol, and esterifying the resulting etherified alkyl phenol alcohol with an acid.

2. The method of producing reaction products which comprises reacting an alkyl phenol in which the alkyl group contains from 4 to 5 carbon atoms with formaldehyde under conditions to produce a monomeric alkyl phenol dihydric alcohol, reacting at a temperature below 40° C. under a vacuum of not above about 30 mm. pressure said monomeric alkyl phenol dihydric alcohol with a polyhydric alcohol reactive therewith to produce a monomeric etherified alkyl phenol alcohol, and esterifying that phenol ether alcohol with a natural acid resin.

3. The method of producing reaction products which comprises reacting an alkyl phenol in which the alkyl group contains from 4 to 5 carbon atoms with formaldehyde under conditions to produce a monomeric alkyl phenol dihydric alcohol, reacting at a temperature below 40° C. under a vacuum of not above about 30 mm. pressure said monomeric alkyl phenol dihydric alcohol with a polyhydric alcohol reactive therewith to produce a monomeric etherified alkyl phenol alcohol, and esterifying that phenol ether alcohol with a fatty acid.

4. The method of producing reaction products which comprises reacting an alkyl phenol in which the alkyl group contains from 4 to 5 carbon atoms with formaldehyde under conditions to produce a monomeric alkyl phenol dihydric alcohol, reacting at a temperature below 40° C. under a vacuum of not above about 30 mm. pressure said monomeric alkyl phenol dihydric alcohol with a polyhydric alcohol reactive therewith to produce a monomeric etherified alkyl phenol alcohol, and esterifying that phenol ether alcohol with a polybasic carboxylic acid.

5. The method of producing reaction products which comprises reacting an alkyl phenol in which the alkyl group contains from 4 to 5 carbon atoms with formaldehyde under conditions to produce a monomeric alkyl phenol alcohol, reacting at a temperature below 40° C. under a vacuum of not above about 30 mm. pressure said monomeric alkyl phenol alcohol with glycerol to produce a monomeric etherified alkyl phenol alcohol, and esterifying the resulting etherified alkyl phenol alcohol with an acid.

6. The method of producing reaction products which comprises reacting an alkyl phenol in which the alkyl group contains from 4 to 5 carbon atoms with formaldehyde under conditions to produce a monomeric alkyl phenol alcohol, reacting at a temperature below 40° C. under a vacuum of not above about 30 mm. pressure said monomeric alkyl phenol alcohol with ethylene glycol to produce a monomeric etherified alkyl phenol alcohol, and esterifying the resulting etherified alkyl phenol alcohol with an acid.

7. The product resulting from the process of claim 1.

8. The product resulting from the process of claim 2.

9. The product resulting from the process of claim 3.

10. The product resulting from the process of claim 4.

11. The product resulting from the process of claim 5.

12. The product resulting from the process of claim 6.

WILLIAM KRUMBHAAR.